Figure 1:
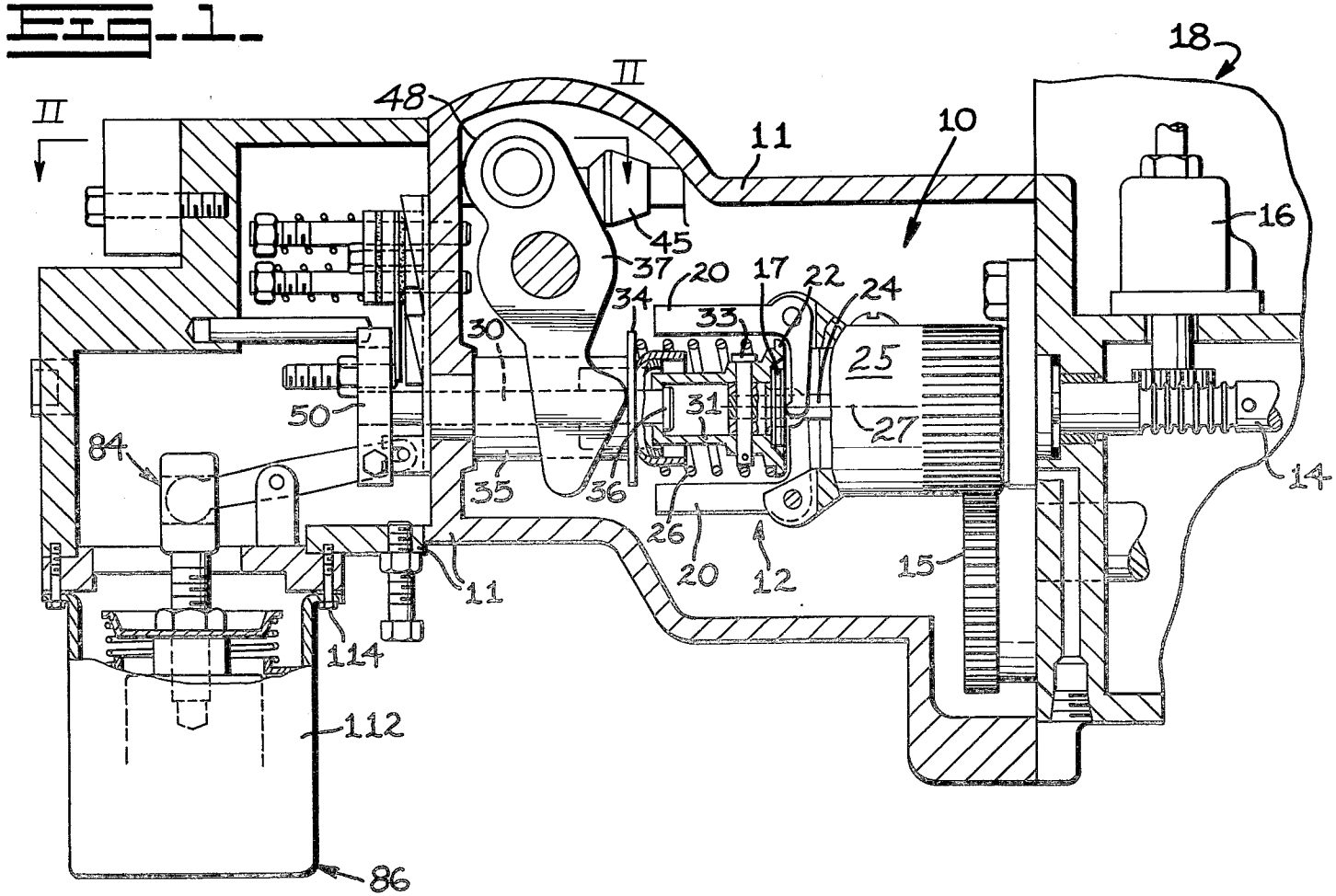
Figure 2:
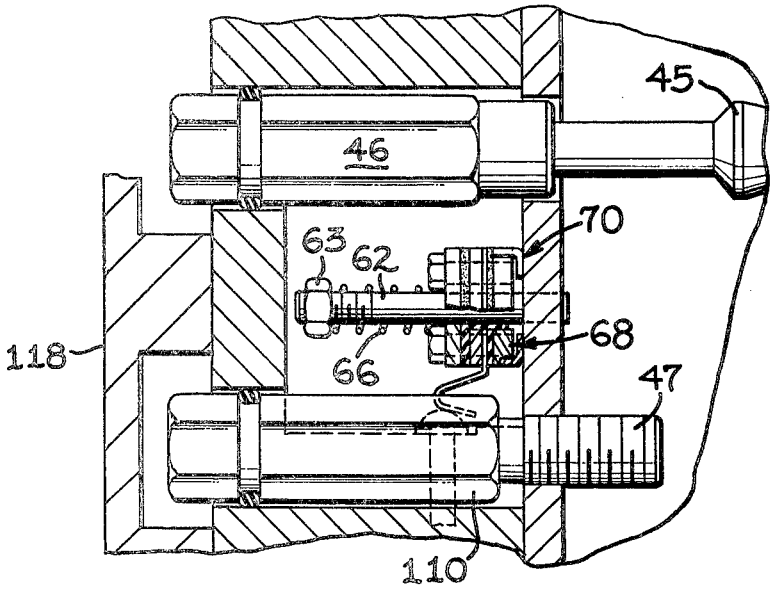
Figure 3:
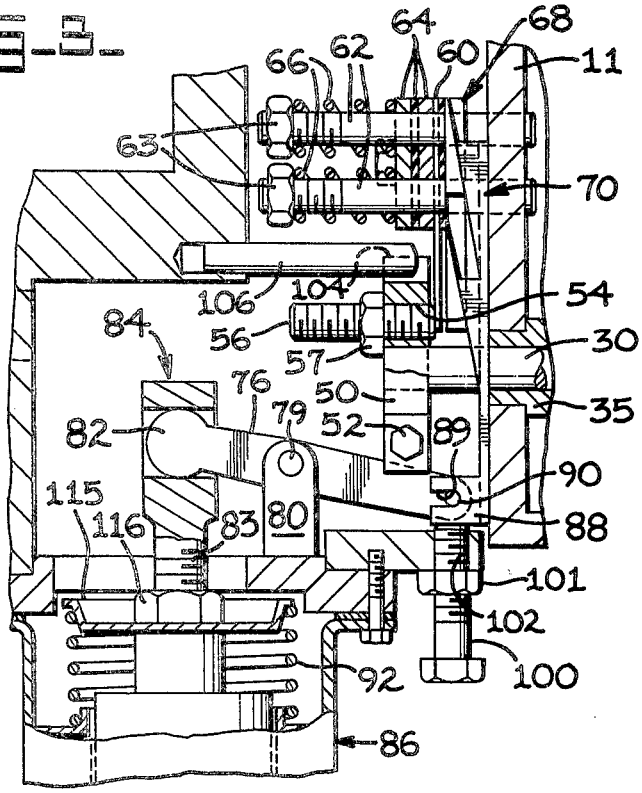
Figure 4:
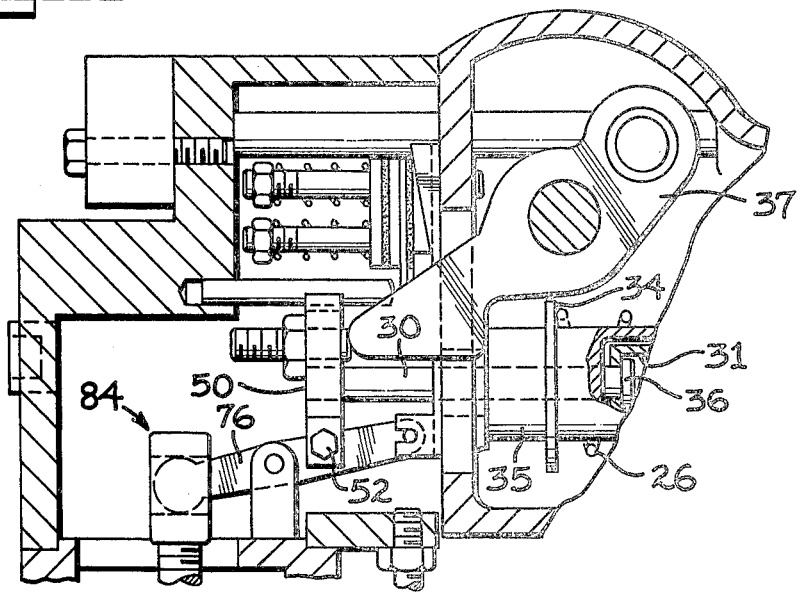
Figure 5:
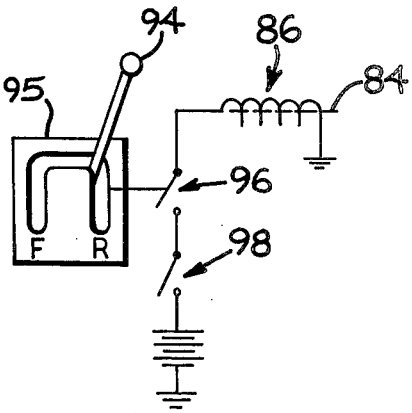
Figure 6:
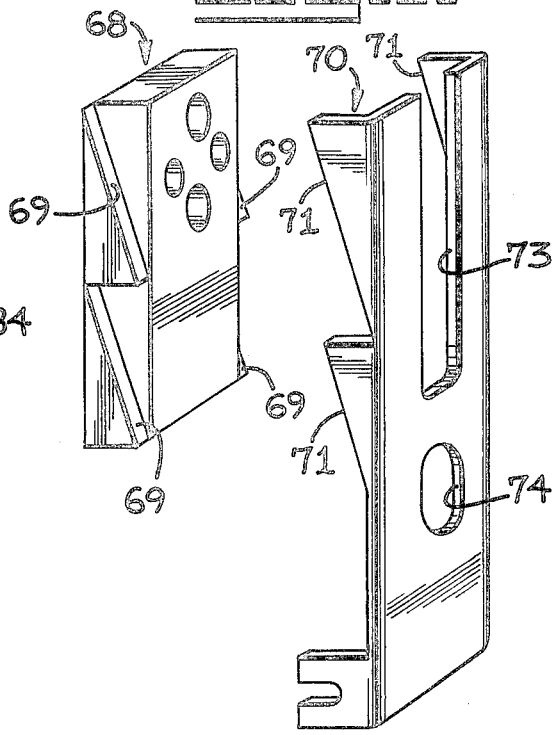

United States Defensive Publication [19] (H) [11] T998,002

Miller et al. [43] Sep. 2, 1980

[54] GOVERNOR DUAL POWER SETTING SELECTION CONTROL

[75] Inventors: Robert H. Miller, Peoria; James C. Smith, Washington, both of Ill.

[73] Assignee: Caterpillar Tractor Co., Peoria, Ill.

[21] Appl. No.: 86,557

[22] Filed: Oct. 19, 1979

[51] Int. Cl.[3] ..... F02D 1/04

[52] U.S. Cl. ..... 123/357

[57] ABSTRACT

A governor for an engine has a fuel supply control mechanism with linearly adjustable yieldable stops that are positionable in at least two discrete positions by selectively actuated first and second coacting adjusting wedges. The cam-like wedges are disposed operatively adjacent the linearly adjustable stops and are slideably repositioned relative to one another when responding to the vehicle speed/direction control. Adjustment or repositioning of the wedges places the fuel control adjustable stops selectively in one of the two discrete positions to control the lug characteristic, torque rise and/or basic operating speed of the engine.

1 Claim, 3 Sheets Drawing,

13 Pages Specification

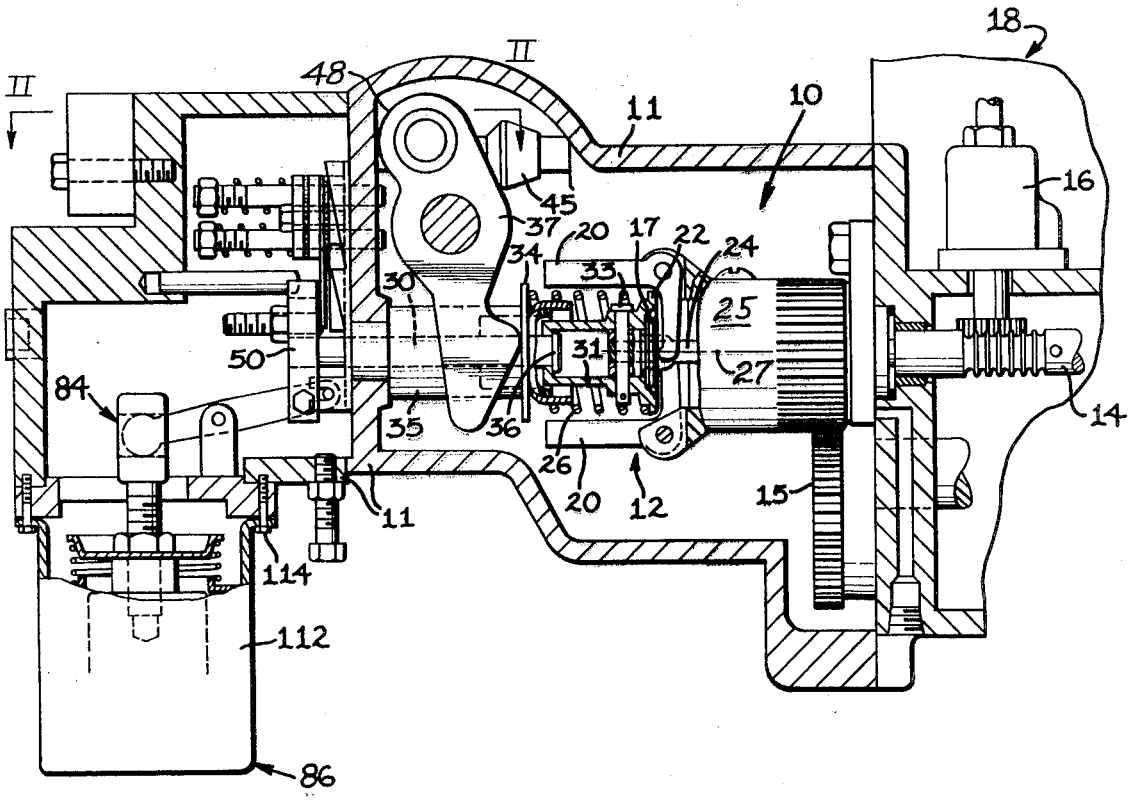

The file of this unexamined application may be inspected and copies thereof may be purchased (849 O.G. 1221, Apr. 9, 1968).